(12) United States Patent
Mathews et al.

(10) Patent No.: US 12,118,249 B2
(45) Date of Patent: Oct. 15, 2024

(54) MEMORY BANK HOTSPOTTING

(71) Applicant: Apple Inc., Cupertino, CA (US)

(72) Inventors: Gregory S. Mathews, Saratoga, CA (US); Kai Lun Hsiung, Fremont, CA (US); Lakshmi Narasimha Murthy Nukala, Pleasanton, CA (US); Shane J. Keil, San Jose, CA (US); Thejasvi Magudilu Vijayaraj, Santa Clara, CA (US); Yanzhe Liu, Sunnyvale, CA (US); Tao Zhang, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/497,883

(22) Filed: Oct. 30, 2023

(65) Prior Publication Data

US 2024/0061617 A1 Feb. 22, 2024

Related U.S. Application Data

(63) Continuation of application No. 17/313,811, filed on May 6, 2021, now abandoned.

(51) Int. Cl.
*G06F 3/06* (2006.01)
*G06F 13/16* (2006.01)

(52) U.S. Cl.
CPC .......... *G06F 3/0659* (2013.01); *G06F 3/0611* (2013.01); *G06F 3/0644* (2013.01); *G06F 3/0673* (2013.01); *G06F 13/1605* (2013.01)

(58) Field of Classification Search
CPC .. G06F 13/1605; G06F 3/0659; G06F 3/0611; G06F 3/064; G06F 3/0673
See application file for complete search history.

(56) References Cited

U.S. PATENT DOCUMENTS

| | | | |
|---|---|---|---|
| 6,047,000 A * | 4/2000 | Tsang | H04L 47/6215 370/468 |
| 7,292,580 B2 * | 11/2007 | Ramamurthy | H04L 12/5601 370/395.42 |
| 7,882,314 B2 * | 2/2011 | Allison | G06F 11/106 711/158 |
| 8,327,057 B1 * | 12/2012 | Venkatramani | G06F 13/1626 711/158 |
| 9,563,369 B2 * | 2/2017 | Quach | G06F 3/0674 |
| 2005/0132146 A1 * | 6/2005 | Kim | G06F 13/1647 711/151 |
| 2008/0316921 A1 * | 12/2008 | Mathews | H04L 47/10 370/230 |

(Continued)

*Primary Examiner* — Tracy A Warren
(74) *Attorney, Agent, or Firm* — Robert C. Kowert; Kowert, Hood, Munyon, Rankin & Goetzel, P.C.

(57) ABSTRACT

Systems, apparatuses, and methods for addressing bank hotspotting are described. A computing system includes a memory controller with an arbiter for determining how to arbitrate access to one or more memory device(s) for received requests. The arbiter categorizes each request in a manner that helps to ensure fair virtual channel distribution across the banks of the memory device(s). The category system includes bank hotspotting functions to give banks that have more requests more chances to go over banks with fewer requests. The category system is implemented proportionally with more category credits given to banks with higher bank depths within the virtual channel.

20 Claims, 8 Drawing Sheets

(56) References Cited

U.S. PATENT DOCUMENTS

| | | | |
|---|---|---|---|
| 2009/0019239 A1* | 1/2009 | Allison | G06F 13/1642 |
| | | | 711/E12.004 |
| 2014/0229645 A1* | 8/2014 | Gabbay | G06F 13/364 |
| | | | 710/113 |
| 2018/0335978 A1* | 11/2018 | Tidwell | G06F 1/28 |
| 2020/0081622 A1* | 3/2020 | Mathews | G06F 3/0604 |
| 2020/0089537 A1* | 3/2020 | Bahirat | G06F 9/468 |
| 2021/0279187 A1* | 9/2021 | Puder | G06F 13/1668 |
| 2022/0019360 A1* | 1/2022 | La Fratta | G06F 3/0659 |

\* cited by examiner

500

505 Detect, by an Allocation Circuit, a Credit Reload Event Condition

510 Calculate the Proportion of Requests to Each Bank Out of the Total Number of Enqueued Requests

515 Calculate the Total Number of Credits as the Sum of the Category 3 Credits, Category 2 Credits, and Proportion of Requests for the Bank

520 Distribute a Number of Category 3 Credits to Each Bank, with the Number of Category 3 Credits that are Distributed being Equal to One Subtracted from the Total Number of Credits for the Bank

525 Distribute a Single Category 2 Credit to Each Bank

FIG. 5

MEMORY BANK HOTSPOTTING

PRIORITY APPLICATION

This application is a continuation of U.S. patent application Ser. No. 17/313,811, filed May 6, 2021, which is hereby incorporated by reference herein in its entirety.

BACKGROUND

Technical Field

Embodiments described herein relate to digital systems and, more particularly, to techniques for scheduling memory access requests using arbitration categories.

Description of the Related Art

Computer systems, including systems-on-a-chip (SoCs), include processors and multiple memory circuits that store software programs or applications, as well as data being operated on by the processors. Such memory circuits may vary in storage capacity as well as access time. In some computer systems, memory circuits are coupled to the processors via a memory controller. Memory circuit communication with the processors is performed via a communication link or other communication network.

During operation of a computer system, the processors, which may include processor cores, graphics processors, and the like, transmit requests for access to the memory controller via the communication link. Such requests may include requests to retrieve previously stored data from the memory circuits or requests to store new data in the memory circuits. The memory controller receives the requests and arbitrates access to the memory circuits for the requests based on various criteria. Upon relaying a particular request from a processor to the memory circuits, the memory controller circuit waits until the memory circuits have completed the particular request, at which point the memory controller circuit sends an acknowledged signal and, in the case of a read access, requested data to the processor that initiated the request.

Quality of Service (QoS) is a policy that enables a computing system to provide a desired performance for the agents in the system. The policy can be defined as a set of requirements that each agent, fabric component, and memory subsystem component should follow to ensure the proper memory service level of each agent in the system. The QoS goal is to provide every agent in the system the appropriate service from the memory subsystem. This service includes at least providing sufficient bandwidth in a given time window, low latency access to memory, maintaining memory ordering rules, and preventing head of line blocking. To provide the above requirements, traffic can be divided into the traffic classes which can be implemented as virtual channels (VCs).

SUMMARY

Systems, apparatuses, and methods for addressing bank hotspotting are contemplated.

In one embodiment, a computing system includes a memory controller with an arbiter for determining how to arbitrate access to one or more memory device(s) for received requests. The arbiter categorizes each request in a manner that helps to ensure fair virtual channel distribution across the banks of the memory device(s). The category system includes bank hotspotting functions to give banks that have more requests more chances to go as compared to banks with fewer requests. The category system is implemented proportionally with more category credits given to banks with higher bank depths within the virtual channel.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which:

FIG. 5 is a flow diagram of one embodiment of a method for distributing credits to banks.

Figure 1:
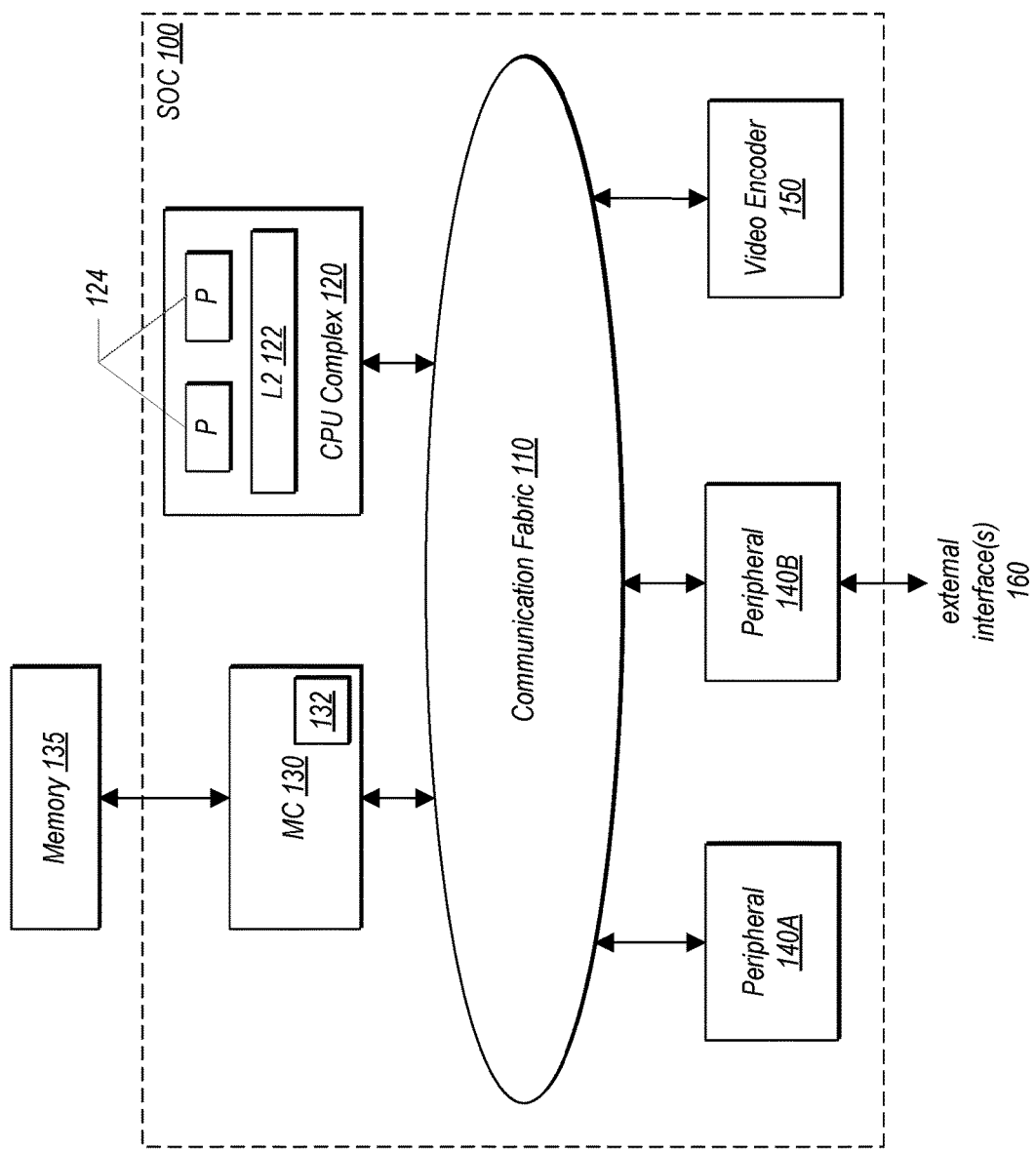
FIG. 1 is a generalized block diagram of one embodiment of a SOC.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring now to FIG. 1, a block diagram of one embodiment of a system-on-a-chip (SOC) is shown. SOC 100 is shown coupled to a memory 135. As implied by the name, the components of the SOC 100 may be integrated onto a single semiconductor substrate as an integrated circuit "chip". It is noted that a "chip" may also be referred to as a "die". In some embodiments, the components may be implemented on two or more discrete chips in a system. However, the SOC 100 will be used as an example herein. In the illustrated embodiment, the components of the SOC 100 include a central processing unit (CPU) complex 120, on-chip peripheral components 140A-140B (more briefly, "peripherals"), a memory controller (MC) 130, a video encoder 150 (which may itself be considered a peripheral component), and a communication fabric 110. The components 120, 130, 140A-140B, and 150 may all be coupled to the communication fabric 110. The memory controller 130 may be coupled to the memory 135 during use, and the peripheral 140B may be coupled to an external interface 160 during use. In the illustrated embodiment, the CPU complex 120 includes one or more processors (P) 124 and a level two (L2) cache 122.

The peripherals 140A-140B may be any set of additional hardware functionality included in the SOC 100. For example, the peripherals 140A-140B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 160 external to the SOC 100 (e.g. the peripheral 140B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

In one embodiment, SOC 100 may include at least one instance of a video encoder 150 component. Video encoder 150 may be an H.264 video encoder apparatus that may be configured to convert input video frames from an input format into H.264/Advanced Video Coding (AVC) format as described in the H.264/AVC standard. In one embodiment, SOC 100 includes CPU complex 120. The CPU complex 120 may include one or more CPU processors 124 that serve as the CPU of the SOC 100. The CPU of the system includes the processor(s) that execute the main control software of the system, such as an operating system. Generally, software executed by the CPU during use may control the other components of the system to realize the desired functionality of the system. The processors 124 may also execute other software, such as application programs. The application programs may provide user functionality, and may rely on the operating system for lower level device control. Accordingly, the processors 124 may also be referred to as application processors.

The CPU complex 120 may further include other hardware such as the L2 cache 122 and/or an interface to the other components of the system (e.g., an interface to the communication fabric 110). Generally, a processor may include any circuitry and/or microcode configured to execute instructions defined in an instruction set architecture implemented by the processor. The instructions and data operated on by the processors in response to executing the instructions may generally be stored in the memory 135, although certain instructions may be defined for direct processor access to peripherals as well. Processors may encompass processor cores implemented on an integrated circuit with other components as a system on a chip or other levels of integration. Processors may further encompass discrete microprocessors, processor cores, and/or microprocessors integrated into multichip module implementations, processors implemented as multiple integrated circuits, and so on.

In various embodiments, memory controller 130 is configured to schedule memory operations (e.g., read access requests, write access requests) to be sent to memory 135 according to an order. In one embodiment, to determine the order, memory controller 130 is configured to maintain a plurality of arbitration category values, including ones that correspond to a given bank of memory 135 and a given quality-of-service level. In one embodiment, the arbitration category values may be stored in a plurality of registers on a per-bank and per quality-of-service level basis. As used and described herein, the term "arbitration category value" is defined as a multi-bit value that specifies one of multiple categories indicative of a priority associated with a particular quality-of-service level for a given bank in a memory circuit. An arbitration category value may be stored as multiple data words in multiple mask vectors.

The memory controller 130 may generally include the circuitry for receiving memory operations from the other components of the SOC 100 and for accessing the memory 135 to complete the memory operations. The memory controller 130 may be configured to access any type of memory 135. For example, the memory 135 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 130 may include queues for memory operations, for ordering (and potentially reordering) the operations and presenting the operations to the memory 135. The memory controller 130 may further include data buffers to store write data awaiting write to memory and read data awaiting return to the source of the memory operation.

In one embodiment, memory controller 130 includes arbiter 132 which attempts to optimize the efficiency of accesses to the banks in the memory devices which make up memory 135. Accordingly, in one embodiment, arbiter 132 allocates arbitration credits to individual banks in proportion to the number of pending requests targeting the banks. This allows banks with more pending requests to receive a larger percentage of the arbitration credits. These banks are then able to receive more requests in subsequent cycles to clear the backlog of pending requests targeting these banks. This helps to ensure a high memory bandwidth efficiency is maintained by memory controller 130. It is noted that an "arbiter" may also be referred to herein as an "arbitration circuit". Also, as used and described herein, the term "bank" is defined as a portion of a memory array in a memory circuit that can be accessed independently from other portions of the memory array.

The communication fabric 110 may be any communication interconnect and protocol for communicating among the components of the SOC 100. The communication fabric 110 may be bus-based, including shared bus configurations, cross bar configurations, and hierarchical buses with bridges. The communication fabric 110 may also be packet-based, and may be hierarchical with bridges, cross bar, point-to-point, or other interconnects. It is noted that the number of components of the SOC 100 (and the number of subcomponents for those shown in FIG. 1, such as within the CPU complex 120) may vary from embodiment to embodiment. There may be more or fewer of each component/subcomponent than the number shown in FIG. 1.

Figure 2:
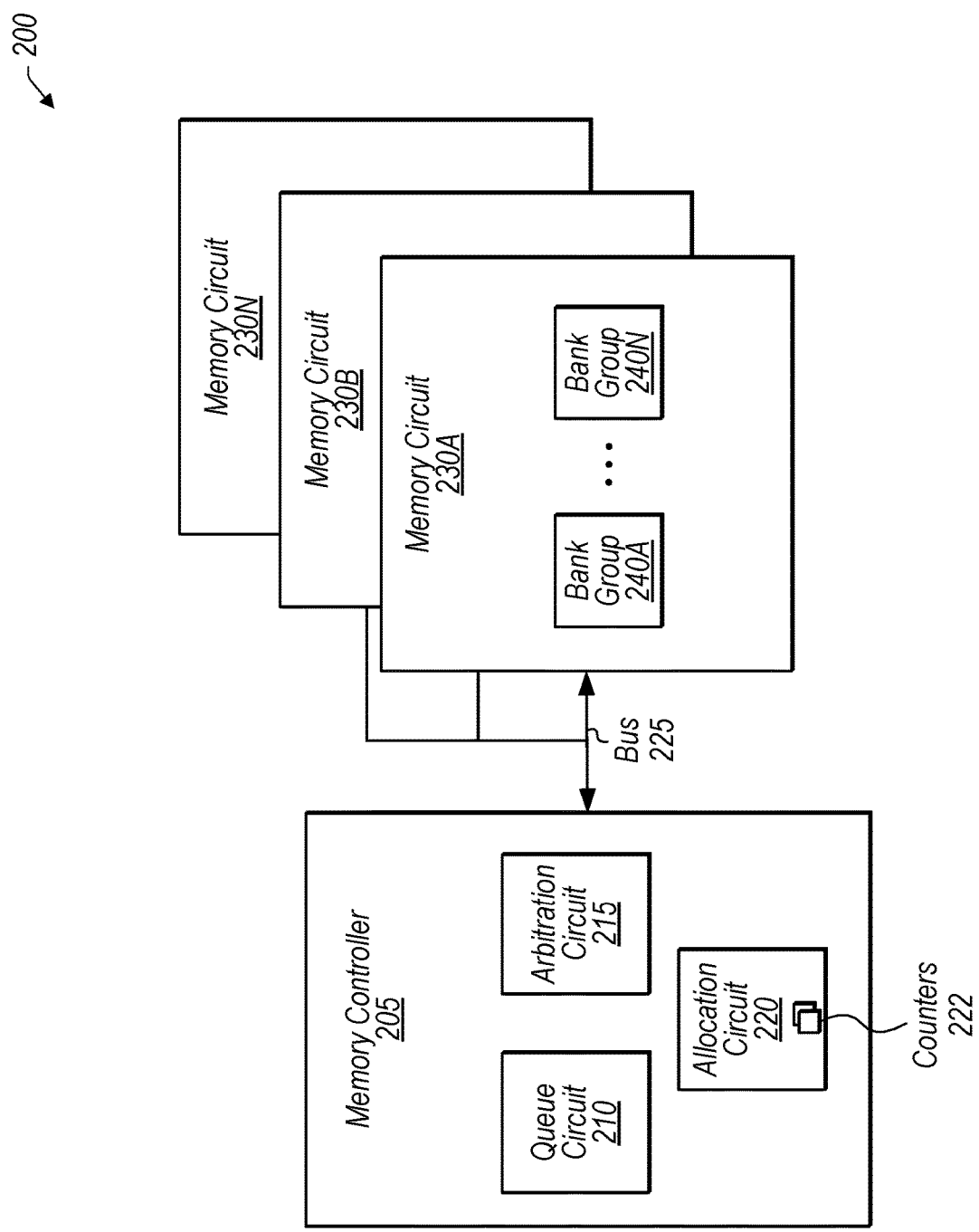
FIG. 2 is a block diagram of one embodiment of a memory system.

Turning now to FIG. 2, a block diagram of one embodiment of a memory system 200 is shown. In one embodiment, system 200 includes memory controller 205 communicating with a plurality of memory circuits 230A-N via bus 225. Memory circuits 230A-N are representative of any number of memory circuits, with each memory circuit having any number of bank groups 240A-N. Memory circuits 230A-N may be implemented using any of various memory technologies. Memory circuits 230A-N may need to be refreshed periodically if implemented as dynamic random-access memory (DRAM). Each bank group 240A-N includes any number of memory banks, with the number of banks per group 240A-N varying according to the memory device technology. For example, in one embodiment, if memory circuits 230A-N are implemented using double data rate 5 synchronous DRAM (DDR5 SDRAM), then there would be four banks per group 240A-N. Other memory device technology circuitry may be structured with other numbers of banks per groups 240A-N.

In one embodiment, memory controller 205 includes at least queue circuit 210, arbitration circuit 215, and allocation circuit 220. It should be appreciated that memory controller 205 may include other circuits which are not shown in FIG. 2. Queue circuit 210 stores requests received by memory controller 205 from various agents. Queue circuit 210 may include any number of separate queues. Arbitration circuit 215 selects which requests are to be sent to access certain banks within memory bank groups 240A-N. Arbitration circuit 215 may attempt to spread out access requests to different banks of memory circuits 230A-N as there may be a delay between consecutive accesses to different pages of the same bank. In one embodiment, arbitration circuit 215 uses quality of service (QoS) information, credit availability, and other information to determine which requests to send to memory circuits 230A-N.

Allocation circuit 220 allocates credits to each of the banks of memory circuits 230A-N based on the proportion of requests in queue circuit 210 which target each bank. For example, in one embodiment, if four pending requests in queue circuit 210 target a first bank and two pending requests in queue circuit 210 target a second bank, allocation circuit 220 would provide twice as many credits to the first bank as the second bank in the next credit reload cycle. Allocation circuit 220 includes a plurality of counters 222 for maintaining the credits for the different virtual channel-bank combinations. For example, there may be one counter 222 for each different virtual channel-bank combination. In one embodiment, counters 222 are fractional counters which can store less than a whole number of credits. Also, in some embodiments, allocation circuit 220 allocates different categories of credits to the banks of memory circuits 230A-N. These and other features will be described in further detail in the remainder of this disclosure.

Figure 3:
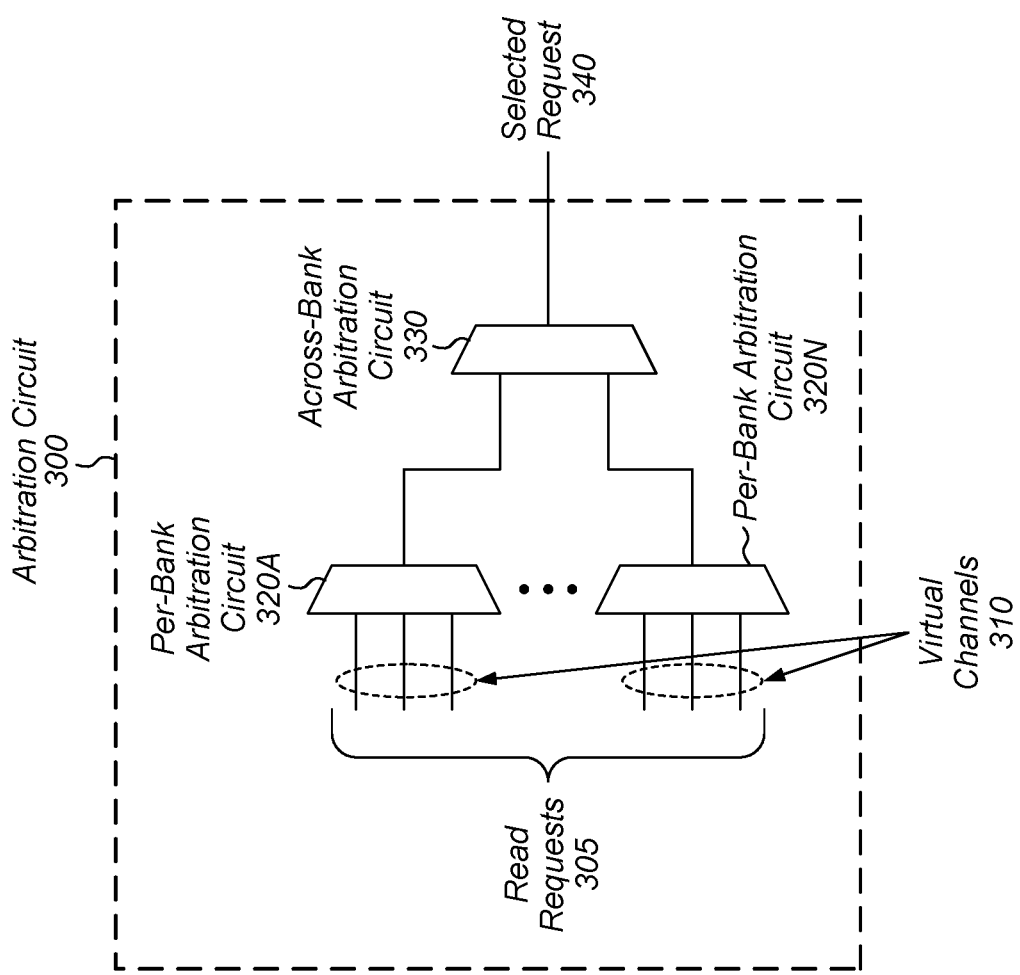
FIG. 3 is a block diagram of one embodiment of an arbitration circuit.

Referring now to FIG. 3, a block diagram depicting an embodiment of a multi-stage arbitration circuit 300 is shown. As shown, arbitration circuit 300 includes per-bank arbitration circuits 320A-N, the outputs of which are coupled to across-bank arbitration circuit 330. Each of per-bank arbitration circuits 320A-N, which may be particular embodiments of multiplex circuits, is associated with a respective bank of multiple banks included in a memory circuit. For a given bank, a corresponding one of per-bank arbitration circuits 320A-N is configured to select an access request from read requests 305 directed to the given bank. The selection may be made based on virtual channels associated with the individual ones of read requests 305, or other suitable priority information. Outputs from each of per-bank arbitration circuits 320A-N are coupled to across-bank arbitration circuit 330, which selects a particular one of the outputs for assignment to a slot included in an upcoming turn.

Across-bank arbitration circuit 330 is configured to select a particular output of per-bank arbitration circuits 320A-N to generate selected request 340. The selection may be made based on a number of available credits for individual virtual channels, arbitration categories, and any other suitable information. For example, across-bank arbitration circuit 330 may use any override information associated with a request, available slots within a turn for low latency virtual channel, and the like. In various embodiments, across-bank arbitration circuit 330 may be a particular embodiment of a multiplex circuit that may include any suitable combination of static logic gates, complex logic gates, or other logic circuits. It is noted that the embodiment depicted in FIG. 3 is merely an example, and that, in other embodiments, different numbers of per-bank arbitration circuits may be employed.

Figure 4:
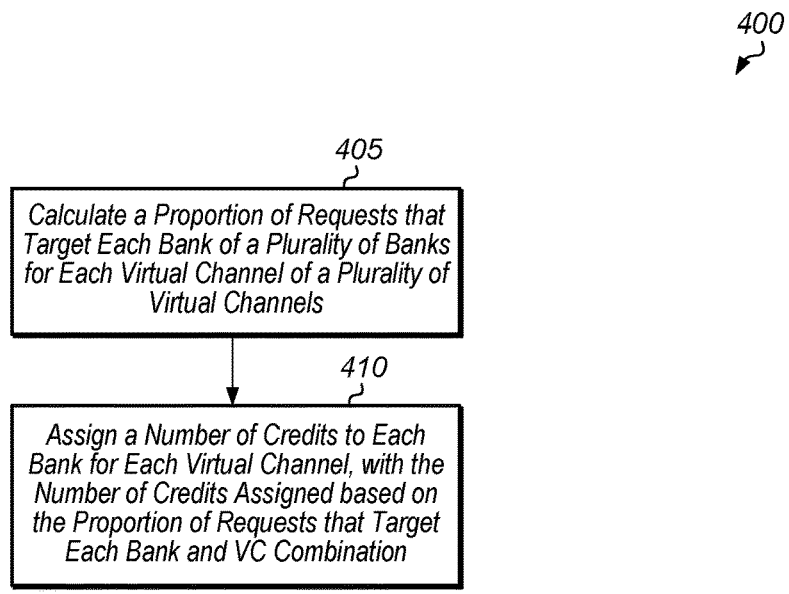
FIG. 4 is a flow diagram of one embodiment of a method for implementing bank hotspotting compensation.

Turning now to FIG. 4, a generalized flow diagram of one embodiment of a method 400 for addressing bank hotspotting is shown. For purposes of discussion, the steps in this embodiment (as well as for FIGS. 5-7) are shown in sequential order. However, in other embodiments some steps may occur in a different order than shown, some steps may be performed concurrently, some steps may be combined with other steps, and some steps may be absent.

A memory controller calculates a proportion of requests that target each bank of a plurality of banks of one or more memory devices for each virtual channel (VC) of a plurality of VCs (block 405). For example, if a memory device has 8 banks, and there are 3 VCs, then the memory controller calculates the proportion of requests that target each of the 8 banks for each of the 3 VCs. In this case, there will be 24 separate proportions that are calculated for the 3 different VCs for each of the 8 banks. Other embodiments may have other numbers of banks per memory device and/or other numbers of VCs. In another embodiment, the memory controller calculates the proportion of requests that target each bank across multiple VCs. In some cases, the memory controller alternates between calculating the proportion of requests for individual VCs and calculating the proportion of requests across multiple VCs based on changes to one or more operating conditions.

Next, the memory controller assigns a number of credits to each bank for each VC, with the number of credits assigned based on the proportion of requests that target each bank and VC combination (block 410). In another embodiment, the memory controller assigns credits to each bank to be used across multiple VCs. After block 410, method 400 ends. Depending on the embodiment, different techniques may be used to assign a number of credits for each bank and VC combination that correlates to the proportion of requests targeting the respective bank and VC combination. Generally speaking, the higher the number of requests that target a given bank and VC combination with respect to other bank and VC combinations, the higher the number of credits which will be assigned to the given bank and VC combination respective to other bank and VC combinations. One example of a technique for assigning numbers of credits for each bank and VC combination that correlates to the proportion of requests targeting the respective bank and VC combination is described in further detail below in the discussion of method 500 of FIG. 5.

Referring now to FIG. 5, a generalized flow diagram of one embodiment of a method 500 for distributing credits to banks is shown. An allocation circuit (e.g., allocation circuit 220 of FIG. 2) detects a credit reload condition (block 505). In one embodiment, the credit reload event condition is each bank signaling that a category 3 credit has been used. In other embodiments, other types of credit reload events may be detected in block 505. Next, in response to detecting the credit reload condition, the allocation circuit calculates the proportion of requests to each bank out of the total number of enqueued requests (block 510). The allocation circuit can perform the calculation in block 510 for requests of a single VC or for requests corresponding to any of multiple VCs, depending on the embodiment. Similarly, blocks 515, 520, and 525 can be performed for a single VC or across multiple VCs, depending on the embodiment.

Also, the allocation circuit calculates the total number of credits as the sum of the category 3 credits, category 2 credits, and proportion of requests for the bank (block 515). Next, the allocation circuit distributes a number of category 3 credits to each bank, with the number of category 3 credits that are distributed being equal to one subtracted from the total number of credits for the bank (block 520). Next, the allocation circuit distributes a single category 2 credit to each bank (block 525). After block 525, method 500 ends. It is noted that method 500 may be repeated for each credit reload cycle.

Figure 6:
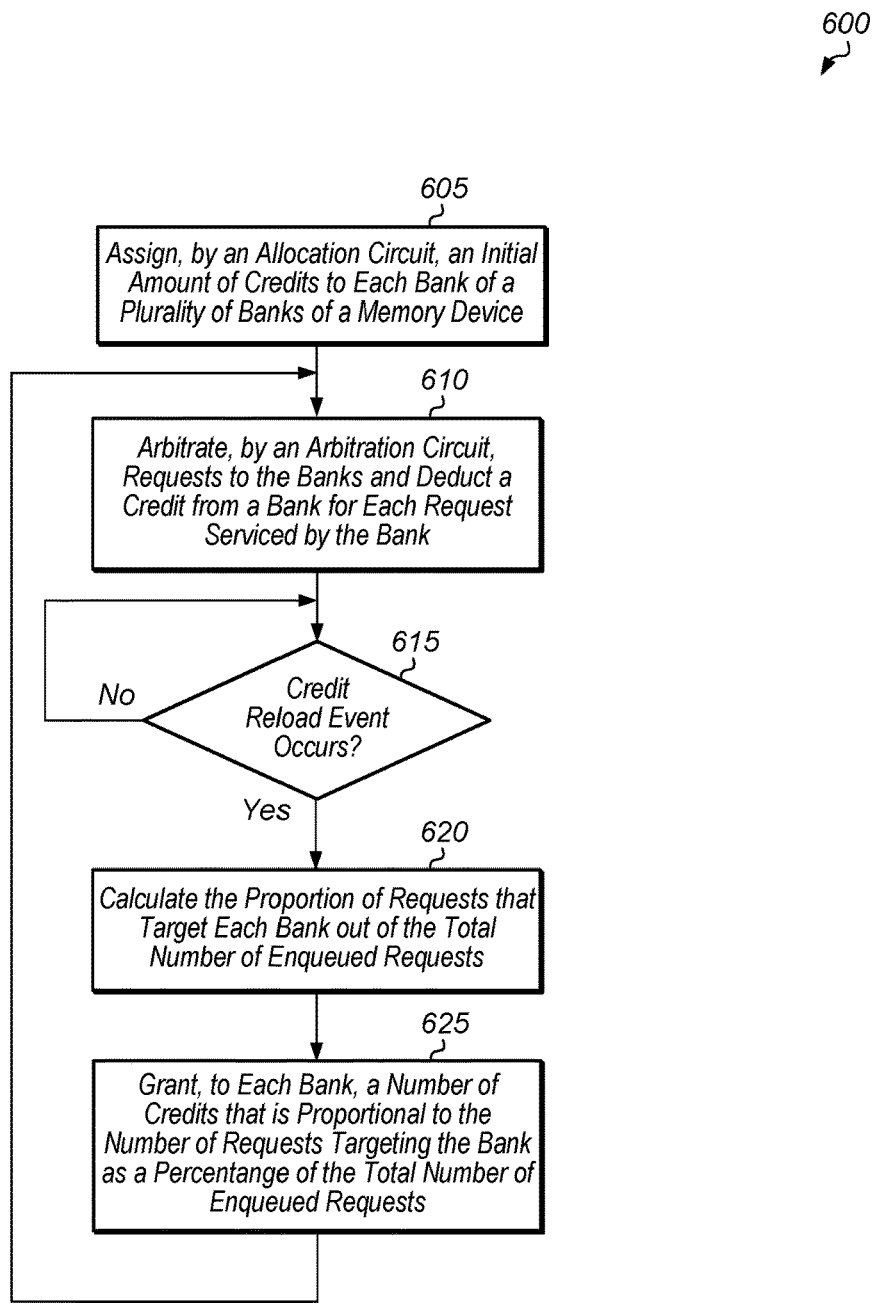
FIG. 6 is a flow diagram of one embodiment of a method for implementing bank hotspotting compensation.

Turning now to FIG. 6, a generalized flow diagram of one embodiment of a method 600 for addressing bank hotspotting is shown. An allocation circuit (e.g., allocation circuit 220 of FIG. 2) assigns an initial amount of credits to each bank of a plurality of banks of a memory device (block 605). The amount of credits assigned to each bank may vary from embodiment to embodiment. In one embodiment, each bank receives a category 3 credit and a category 2 credit in the initial assignment. An arbitration circuit (e.g., arbitration circuit 215) arbitrates requests to the banks and deducts a credit from a bank for each request serviced by the bank (block 610). If a credit reload event occurs (conditional block 615, "yes" leg), then the allocation circuit calculates the proportion of requests that target each bank out of the total number of enqueued requests (block 620). Next, the control unit grants, to each bank, a number of credits that is proportional to the number of requests targeting the bank as a percentage of a total number of enqueued requests (block 625). It is noted that the granted number of requests is allowed to be a fractional amount in some embodiments. After block 625, method 600 returns to block 610. It is also noted that a separate instance of method 600 may be performed for each VC in one embodiment.

Figure 7:
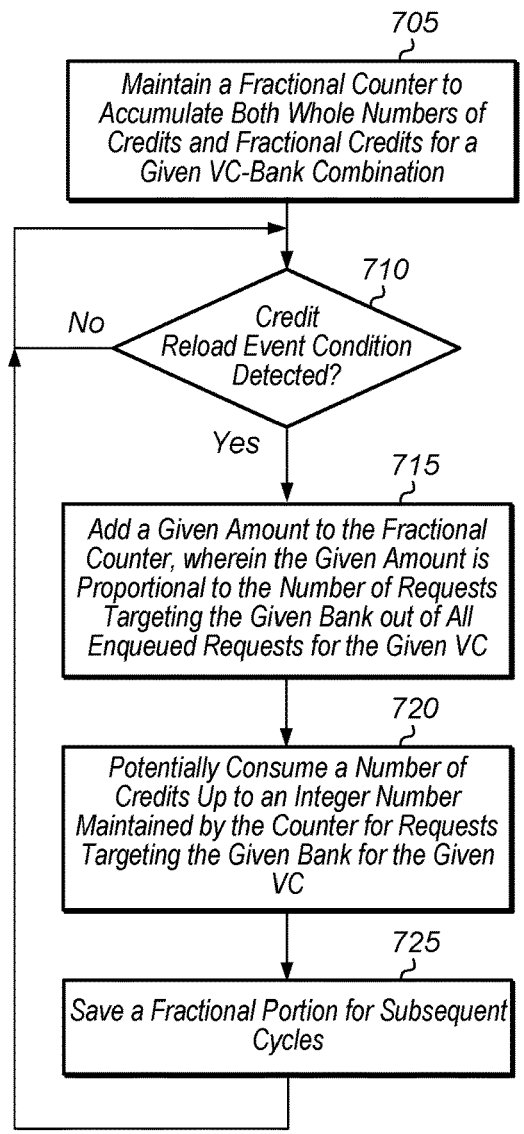
FIG. 7 is a flow diagram of one embodiment of a method for performing a proportional credit reload.

Referring now to FIG. 7, one embodiment of a method 700 for performing a proportional credit reload is shown. An allocation circuit (e.g., allocation circuit 220 of FIG. 2) maintains a fractional counter to accumulate both whole numbers of credits and fractional credits for a given VC-bank combination (block 705). It is noted that the allocation circuit may maintain a fractional counter for each VC-bank combination corresponding to a plurality of VCs and a plurality of banks. While method 700 is described in the context of a single fractional counter, it should be understood that method 700 can also be implemented for other fractional counters maintained by the allocation circuit.

If a credit reload event condition is detected (conditional block 710, "yes" leg), then a given amount is added to the fractional counter, wherein the given amount is proportional to the number of requests targeting the given bank out of all enqueued requests for the given VC (block 715). In one embodiment, the credit reload event condition is each bank signaling that a category 3 credit has been used.

Next, an arbitration circuit (e.g., arbitration circuit 215) potentially consumes a number of credits up to an integer number maintained by the counter for requests targeting the given bank for the given VC (block 720). Also, the arbitration circuit saves a fractional portion of the counter for subsequent cycles (block 725). If the fractional portion overflows in a subsequent cycle and becomes a whole number of credits, the credits can be used in the subsequent cycle. For example, if the allocation circuitry assigned 1.25 credits per cycle to a given VC-bank combination, the given bank could use 1 credit for the given VC for 3 cycles, and then would use 2 credits on the 4th cycle. In this example, it is assumed that the allocation circuitry assigns 1.25 to the given VC-bank combination for 4 consecutive cycles. However, in practice, the amount of credits per cycle would likely vary since the amount of credits is based on the proportion of enqueued requests which target the given VC-bank combination. After block 725, method 700 returns to conditional block 710.

Figure 8:
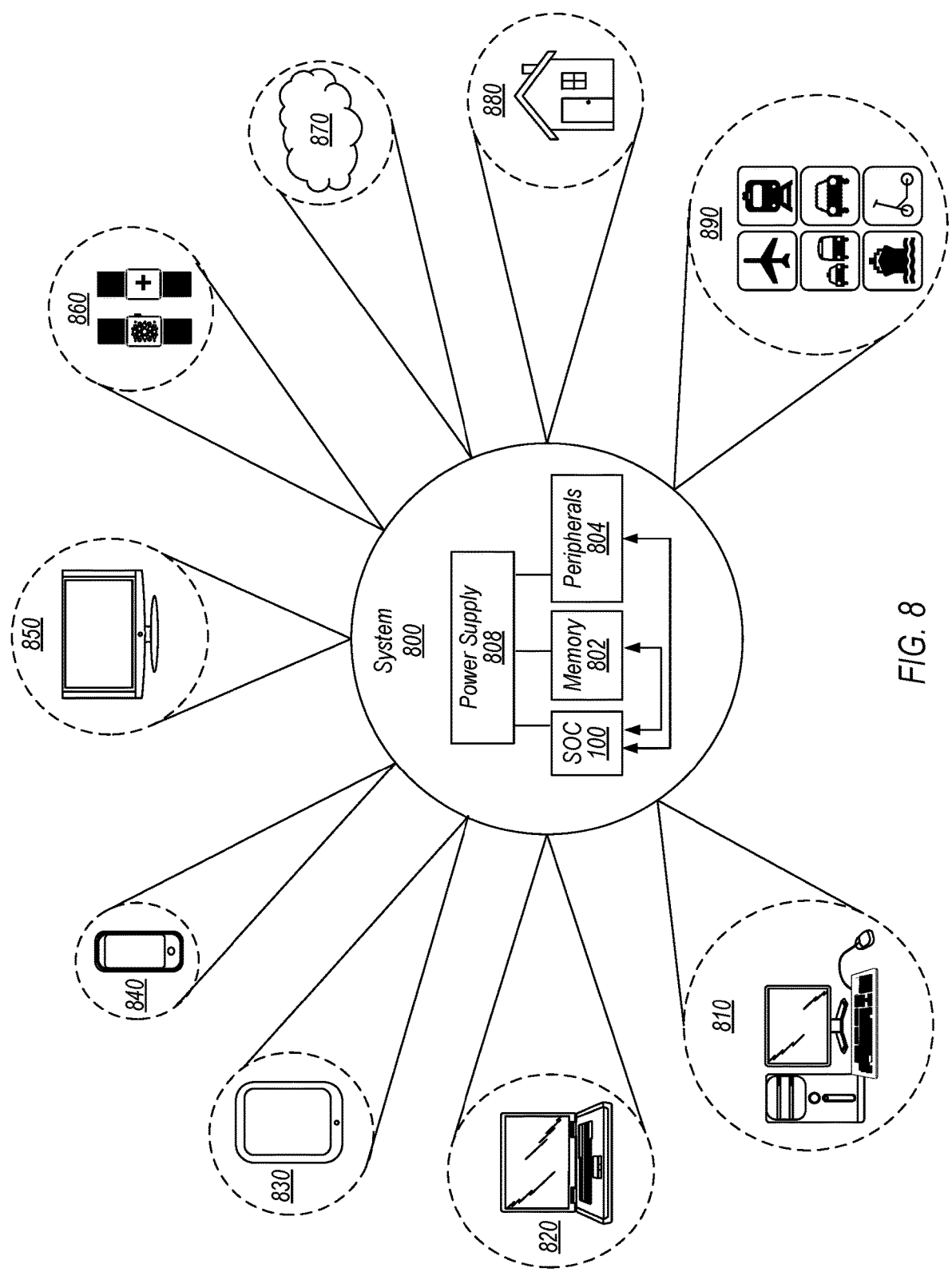
FIG. 8 is a block diagram of one embodiment of a system.

Turning now to FIG. 8, a block diagram of one embodiment of a system 800 is shown that may incorporate and/or otherwise utilize the methods and mechanisms described herein. In the illustrated embodiment, the system 800 includes at least a portion of SoC 100 (of FIG. 1) which may include multiple types of processing units, such as a central processing unit (CPU), a graphics processing unit (GPU), or otherwise, a communication fabric, and interfaces to memories and input/output devices. In various embodiments, SoC 100 is coupled to external memory 802, peripherals 804, and power supply 808.

A power supply 808 is also provided which supplies the supply voltages to SoC 100 as well as one or more supply voltages to the memory 802 and/or the peripherals 804. In various embodiments, power supply 808 represents a battery (e.g., a rechargeable battery in a smart phone, laptop or tablet computer, or other device). In some embodiments, more than one instance of SoC 100 is included (and more than one external memory 802 may be included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 804 include any desired circuitry, depending on the type of system 800. For example, in one embodiment, peripherals 804 includes devices for various types of wireless communication, such as wifi, Bluetooth, cellular, global positioning system, etc. In some embodiments, the peripherals 804 also include additional storage, including RAM storage, solid state storage, or disk storage. The peripherals 804 include user interface devices such as a display screen, including touch display screens or multi-touch display screens, keyboard or other input devices, microphones, speakers, etc.

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 800 may further be used as part of a cloud-based service(s) 870. For example, the previously mentioned devices, and/or other devices, may access computing resources in the cloud (i.e., remotely located hardware and/or software resources). Still further, system 800 may be utilized in one or more devices of a home 880 other than those previously mentioned. For example, appliances within the home 880 may monitor and detect conditions that warrant attention. For example, various devices within the home 880 (e.g., a refrigerator, a cooling system, etc.) may monitor the status of the device and provide an alert to the homeowner (or, for example, a repair facility) should a particular event be detected. Alternatively, a thermostat may monitor the temperature in the home 880 and may automate adjustments to a heating/cooling system based on a history of responses to various conditions by the homeowner. Also illustrated in FIG. 8 is the application of system 800 to various modes of transportation 890. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise. These and many other embodiments are possible and are contemplated. It is noted that the devices and applications illustrated in FIG. 8 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to," An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A memory controller, comprising:
   arbitration circuitry configured to forward memory requests to individual banks of a plurality of banks of a memory device that have a credit available; and
   allocation circuitry, wherein for an iteration of a plurality of iterations, the allocation circuitry is configured to:
      determine, for a bank of the plurality of banks, a total credit comprising a sum of a previous fractional credit and a given credit, wherein the previous fractional credit is maintained from a previous iteration of the plurality of iterations, and wherein the total credit comprises one or more whole credits and a current fractional credit different from the previous fractional credit;
      grant the one or more whole credits to the bank for arbitration of memory access requests; and
      maintain the current fractional credit for the bank as an input to a subsequent iteration of the plurality of iterations.

2. The memory controller of claim 1, wherein the arbitration circuitry is configured to forward the memory requests to the individual banks of the plurality of banks on a basis of respective numbers of whole credits.

3. The memory controller of claim 1, wherein the arbitration circuitry is further configured to:
   arbitrate between the memory requests to individual banks of the plurality of banks; and
   deduct a whole credit from a particular bank for a request serviced by the particular bank.

4. The memory controller of claim 1, wherein the given credit is determined in proportion to a number of memory requests targeting the bank relative to a total number of memory requests targeting the plurality of banks.

5. The memory controller of claim 4, wherein the given credit comprises at least one whole credit and a given fractional credit.

6. The memory controller of claim 1, wherein the allocation circuitry is further configured to assign, at an initialization event, an initial amount of whole credits to individual ones of the plurality of banks.

7. The memory controller of claim 1, wherein the memory requests are read requests which target the plurality of banks.

8. A method, comprising:
forwarding, by arbitration circuitry, memory requests to individual banks of a plurality of banks of a memory device that have a credit available; and
performing, by allocation circuitry, an iteration of a plurality of iterations, comprising:
determining, for a bank of the plurality of banks, a total credit comprising a sum of a previous fractional credit and a given credit, wherein the previous fractional credit is maintained from a previous iteration of the plurality of iterations, and wherein the total credit comprises one or more whole credits and a current fractional credit different from the previous fractional credit;
granting the one or more whole credits to the bank for arbitration of memory access requests; and
maintaining the current fractional credit for the bank as an input to a subsequent iteration of the plurality of iterations.

9. The method of claim 8, wherein the arbitration circuitry forwards the memory requests to the individual banks of the plurality of banks on a basis of respective numbers of whole credits.

10. The method of claim 8, further comprising performing, by the arbitration circuitry:
arbitrating between the memory requests to individual banks of the plurality of banks; and
deducting a whole credit from a particular bank for a request serviced by the particular bank.

11. The method of claim 8, wherein the given credit is determined in proportion to a number of memory requests targeting the bank relative to a total number of memory requests targeting the plurality of banks.

12. The method of claim 11, wherein the given credit comprises at least one whole credit and a given fractional credit.

13. The method of claim 8, further comprising assigning, by the allocation circuitry at an initialization event, an initial amount of whole credits to individual ones of the plurality of banks.

14. The method of claim 8, wherein the memory requests are read requests which target the plurality of banks.

15. A system, comprising:
a memory device comprising a plurality of banks; and
a memory controller configured to:
forward memory requests to individual banks of the plurality of banks that have a credit available; and
perform, for an iteration of a plurality of iterations:
determine, for a bank of the plurality of banks, a total credit comprising a sum of a previous fractional credit and a given credit, wherein the previous fractional credit is maintained from a previous iteration of the plurality of iterations, and wherein the total credit comprises one or more whole credits and a current fractional credit different from the previous fractional credit;
grant the one or more whole credits to the bank for arbitration of memory access requests; and
maintain the current fractional credit for the bank as an input to a subsequent iteration of the plurality of iterations.

16. The system as recited in claim 15, wherein the memory controller is configured to forward the memory requests to individual banks of the plurality of banks on a basis of respective numbers of whole credits.

17. The system as recited in claim 15, wherein the memory controller is further configured to:
arbitrate between the memory requests to individual banks of the plurality of banks; and
deduct a whole credit from a particular bank for a request serviced by the particular bank.

18. The system as recited in claim 15, wherein the given credit is determined in proportion to a number of memory requests targeting the bank relative to a total number of memory requests targeting the plurality of banks.

19. The system as recited in claim 15, wherein the given credit comprises at least one whole credit and a given fractional credit.

20. The system as recited in claim 15, wherein the memory controller is further configured to assign, at an initialization event, an initial amount of whole credits to individual ones of the plurality of banks.

* * * * *